US010715317B2

(12) United States Patent
Chari et al.

(10) Patent No.: US 10,715,317 B2
(45) Date of Patent: Jul. 14, 2020

(54) PROTECTION OF CONFIDENTIALITY, PRIVACY AND FINANCIAL FAIRNESS IN A BLOCKCHAIN BASED DECENTRALIZED IDENTITY MANAGEMENT SYSTEM

(71) Applicant: International Business Machines Corporation, Armonk, NY (US)

(72) Inventors: Suresh Chari, Scarsdale, NY (US); Hasini Gunasinghe, West Lafayette, IN (US); Ashish Kundu, Elmsford, NY (US); Kapil Kumar Singh, Cary, NC (US); Dong Su, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 15/839,117

(22) Filed: Dec. 12, 2017

(65) Prior Publication Data

US 2019/0182035 A1 Jun. 13, 2019

(51) Int. Cl.
*H04L 29/00* (2006.01)
*H04L 9/08* (2006.01)
*H04L 29/06* (2006.01)
*H04L 9/32* (2006.01)

(52) U.S. Cl.
CPC ............ *H04L 9/083* (2013.01); *H04L 9/0861* (2013.01); *H04L 9/0894* (2013.01); *H04L 9/3239* (2013.01); *H04L 9/3297* (2013.01); *H04L 63/0428* (2013.01); *H04L 2209/38* (2013.01); *H04L 2209/56* (2013.01)

(58) Field of Classification Search
CPC ..... H04L 9/083; H04L 9/0861; H04L 9/0894; H04L 9/3239; H04L 9/3297; H04L 63/0428; H04L 2209/38; H04L 2209/56
See application file for complete search history.

(56) References Cited

U.S. PATENT DOCUMENTS

| 6,636,966 B1* | 10/2003 | Lee .......................... G06F 21/10 713/165 |
| 7,421,583 B1* | 9/2008 | Berson ................. G06Q 20/085 380/255 |
| 9,298,806 B1* | 3/2016 | Vessenes .............. G06Q 20/065 |
| 9,344,425 B2* | 5/2016 | Belton ................ H04L 63/0823 |
| 9,344,832 B2* | 5/2016 | Schell ................ H04L 63/0853 |

(Continued)

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Don G Zhao
(74) *Attorney, Agent, or Firm* — Law Office of Jim Boice

(57) ABSTRACT

A processor-implemented method improves security in a blockchain network of devices, which supports a blockchain, by protecting security, privacy, financial fairness, and secure transfer of identity assets. An identity asset provider device creates an identity asset related to an entity. The identity asset provider also creates a provider key, which is composed of multiple bits, and which is needed to decrypt an encrypted version of the identity asset. The identity asset provider device transmits the provider key bit-by-bit to an identity asset consumer device. A price for the provider key depends on how many bits have been transmitted to the identity asset consumer device.

20 Claims, 17 Drawing Sheets

(56) References Cited

U.S. PATENT DOCUMENTS

| | | | |
|---|---|---|---|
| 9,635,000 B1* | 4/2017 | Muftic | H04L 63/0435 |
| 2001/0044786 A1* | 11/2001 | Ishibashi | G06Q 20/04 |
| | | | 705/77 |
| 2001/0053223 A1* | 12/2001 | Ishibashi | G06F 21/10 |
| | | | 380/231 |
| 2004/0105549 A1* | 6/2004 | Suzuki | H04L 9/083 |
| | | | 380/278 |
| 2006/0120520 A1* | 6/2006 | Suzuki | G06F 21/602 |
| | | | 380/28 |
| 2006/0168451 A1* | 7/2006 | Ishibashi | G06F 21/10 |
| | | | 713/176 |
| 2007/0263875 A1* | 11/2007 | Kitaya | H04L 9/0836 |
| | | | 380/279 |
| 2008/0244685 A1* | 10/2008 | Andersson | G06F 21/53 |
| | | | 726/1 |
| 2010/0198670 A1* | 8/2010 | Kano | G06Q 30/02 |
| | | | 705/14.16 |
| 2013/0038424 A1* | 2/2013 | Katar | H04H 20/71 |
| | | | 340/5.8 |
| 2014/0344015 A1* | 11/2014 | Puertolas-Montanes | |
| | | | G06Q 20/10 |
| | | | 705/7.29 |
| 2015/0026072 A1* | 1/2015 | Zhou | H04M 1/72522 |
| | | | 705/71 |
| 2015/0164192 A1* | 6/2015 | Gross | A45C 1/12 |
| | | | 232/4 R |
| 2015/0324787 A1* | 11/2015 | Schaffner | G06Q 20/06 |
| | | | 705/67 |
| 2015/0356523 A1* | 12/2015 | Madden | G06Q 20/065 |
| | | | 705/76 |
| 2016/0027229 A1* | 1/2016 | Spanos | G07C 13/00 |
| | | | 705/51 |
| 2016/0085955 A1* | 3/2016 | Lerner | G06F 21/31 |
| | | | 726/20 |
| 2016/0217532 A1* | 7/2016 | Slavin | G06Q 30/0276 |
| 2016/0283941 A1* | 9/2016 | Andrade | H04L 9/3247 |
| 2016/0330027 A1* | 11/2016 | Ebrahimi | H04L 9/3066 |
| 2017/0011460 A1* | 1/2017 | Molinari | G06Q 40/04 |
| 2017/0140408 A1 | 5/2017 | Wuehler | |
| 2017/0272250 A1* | 9/2017 | Kaliski, Jr. | H04L 61/1511 |
| 2018/0078843 A1* | 3/2018 | Tran | G16H 40/63 |
| 2018/0117446 A1* | 5/2018 | Tran | A63B 71/085 |
| 2018/0326291 A1* | 11/2018 | Tran | A63B 71/06 |
| 2019/0096534 A1* | 3/2019 | Joao | H04L 65/403 |
| 2019/0158674 A1* | 5/2019 | Nelson | H04L 63/123 |

OTHER PUBLICATIONS

Kosba et al., "HAWK: The Blockchain Model of Cryptography and Privacy-Preserving Smart Contracts." Security and Privacy (SP), 2016 IEEE Symposium on. IEEE, 2016, pp. 839-858.

Asharov G., et al. (2015) Complete Characterization of Fairness in Secure Two-Party Computation of Boolean Functions. In: Dodis Y., Nielsen J.B. (eds) Theory of Cryptography. TCC 2015. Lecture Notes in Computer Science, vol. 9014. Springer, Berlin, Heidelberg, pp. 1-37.

Clack et al., "Smart Contract Templates: Foundations, Design Landscape and Research Directions." Arxiv Preprint Arxiv: 1608.00771 (2016), pp. 1-15.

Peters et al., "Understanding Modern Banking Ledgers Through Blockhain Technologies: Future of Transaction Processing and Smart Contracts on the Internet of Money." Banking Beyond Banks and Money. Springer International Publishing, 2016, pp. 1-33.

Beck et al., "Blockchain-The Gateway to Trust-Free Cryptographic Transactions." ECIS, Twenty-Fourth European Conference on Information Systems, Istanbul, Turkey, 2016, pp. 1-14.

Delgado-Segura et al., "A Fair Protocol for Data Trading Based on Bitcoin Transactions." Future Generation Computer Systems (2017), pp. 1-23.

Manuel Blum, "How to Exchange (Secret) Keys." ACM Transactions on Computer Systems (TCOS) 1.2 (1983): 175-193.

Marcin Andrychowicz et al.. 2014. Secure Multiparty Computations on Bitcoin. In Proceedings of the 2014 IEEE Symposium on Security and Privacy (SP '14). IEEE Computer Society, Washington, DC, USA, 443-458. DOI: http://dx.doi.org/10.1109/SP.2014.35.

L. Brandao et al., "Toward Mending Two Nation-Scale Brokered Identification Systems," In Proceedings on Privacy Enhancing Technologies, 2015, pp. 135-155.

Anonymous, "IBM and Securekey Technologies to Deliver Block-Chain Based Digital Identity Network for Consumers", https://securekey.com/press-releases, Mar. 20, 2017, pp. 1-6.

B. Parno et al., "Pinocchio: Nearly Practical Verifiable Computation," In IEEE Symposium on Security and Privacy, 2013, pp. 1-16.

* cited by examiner

| USE CASE | SAMPLE IDENTITY VERIFICATION / DUE DILIGENCE CHECKLIST |
|---|---|
| 1. CONSUMING FINANCIAL SERVICES OFFERED BY A BANK | • IDENTITY (E.G. PASSPORT)<br>• FINANCIAL ELIGIBILITY<br>• PROOF OF ADDRESS<br>• STATUS OF ANTI-MONEY-LAUNDERING(AML), COUNTER-TERRORIST FINANCING (CTF) AND NON-POLITICALLY EXPOSED PERSON (PEP) [1] |
| 2. JOINING A NEW EMPLOYMENT | • IDENTITY (E.G. PASSPORT)<br>• VISA STATUS (1-20, 1-94)<br>• EMPLOYMENT ELIGIBILITY (SSN)<br>• EMPLOYMENT HISTORY FOR 5 YEARS, EDUCATION HISTORY<br>• BACKGROUND CHECK ON CHARACTER / REPUTATION / PROFESSIONAL EXPERIENCE |
| 3. APPLYING FOR TEMPORARY VISA IN A FOREIGN COUNTRY | • PROOF OF CITIZENSHIP<br>• PROOFS OF RETURNING TO THE HOME COUNTRY SUCH AS USER'S ASSETS AND BONDS<br>• CRIMINAL HISTORY |

VERIFICATION OF KYC COMPLIANCE FOR BOB

| ATTRIBUTE NAME | VALUE | DATE VERIFIED/ EXPIRY DATE | SOURCE(S) OF INFORMATION AND LOA | IN PERSON/ REMOTE |
|---|---|---|---|---|
| PRIMARY IDENTITIES | COPIES | 03/17 / 06/22 | N/A | IN PERSON |
| PEP STATUS | DETAILS | 03/17 / 03/25 | XYZ | REMOTE |
| AML STATUS | DETAILS | 03/17 / 03/22 | ABC | REMOTE |
| CTF STATUS | ... | ... | ... | ... |

RELATIONSHIP ATTRIBUTES
DATE OF ORIGIN : XX-XX-XXXX
VALIDITY PERIOD : XX YEARS
VALUE : PLATINUM/GOLD/SILVER/ETC.

FIG. 3

Protocol 3 Assurance of Financial Fairness

Inputs: identity asset: $A$, key for encrypting the identity asset: $K$, hash of $A$ ($=h'$), monetary payment for $A$.

Output: Identity asset is transferred to the identity consumer and monetary payment is received by the provider.

Protocol execution:
<u>Handshake Phase:</u>
During the handshake phase of the anonymous identity exchange protocol, identity provider and identity consumer agree on following things:
1. Threshold number of bits $l$ to be transferred such that it is considered trivial to bruteforce $n - l$ number of bits where $n$ is the total number of bits in the key $K$.
2. Distribution of monetary payment over the bits.
3. A key $K'$ to encrypt the bits transferred to consumer.

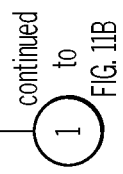

FIG. 11A

*Transfer Phase:*
1. IAP:
i. Encrypts the identity asset using $K$: $T_A = Enc_K(A)$.
ii. Posts $T_A$ to the blockchain.
iii.   Makes a commitment to the key $K$: $C_K = commit(K, r_k)$.
iv.   Makes zero knowledge proofs on the following:
- Hash of the identity asset committed in the ownership declaration (refer the other document on ownership assurance in anonymous identity exchange) commitment is same as the hash of the identity asset encrypted in $T_A$.
- The key used in $T_A$ is the same as the key committed in $C_K$.
v. Posts to the blockchain, the bit $b_i$, where $i \in \{1, 2, 3, ..., n\}$, encrypted with the agreed key $K'$ and if $i \leq n/2$, the bit $b_{n-i}$ is double encrypted: first with $K'$ and second with $E$, and posted to the blockchain as well. Let $b_{i}s$ are called forward-order bits and $b_{n-i}$ are called reverse-order bits.
vi. Proves in zero knowledge that $b_1$ and $b_{n-i}$ are the correct bits committed in $C_K$.

FIG. 11B

2. IAC:
i. If the proofs made by IAP at the step: 1.iv and 1.vi are verified successfully, IAC makes time-locked payments with conditions specified, via blockchain for the bits: $b_1$ and $b_{n-i}$.
- Both IAP and IAC continues the protocol like this bit by bit.
- If both IAP and IAC complete the protocol successfully, IAC would have received all the bits of the key that it can decrypt and IAP could claim all the money payments that IAC has made.
- If the provider aborts in the middle, the blockchain peers get together and decrypt all the reverse order bits that the IAP has posted to the blockchain up to that point and transfer them to IAC.
- If the consumer aborts in the middle, the blockchain approves the provider to redeem the money payments that the consumer has made so far.
- The zero knowledge proofs made by the IAP at the steps 1.iv and 1.vi ensure that the IAP does not transfer garbage bits.
- Following table lists out what each party obtains if the other party aborts the protocol at different stages of bit transfer and what the blockchain does in such cases.

FIG. 11C

| POSITION OF THE BIT | IAP aborts | IAC aborts | Blockchain (BC)'s work |
|---|---|---|---|
| <1/2 | - IAP gets nothing.<br>- IAC gets both forward-order bits and the corresponding reverse-order bits. | - IAP gets only the forward-order bits.<br>- IAP gets payments for both the forward-order bits and for the reverse-order bits. | If IAP aborts, BC decrypts the reverse-order bits for IAC. |
| ≥1/2 AND <N/2 | - IAP gets payment for half of the forward-order bits.<br>- IAC gets both forward-order bits and the corresponding reverse-order bits. | - IAC gets only the forward-order bits.<br>- IAP gets payments for both the forward-order bits and for the reverse-order bits. | Same as above. |
| ≥N/2 AND <N/2 | - IAP gets payment for all of the forward-order bits.<br>- IAC gets both forward-order bits and the corresponding reverse-order bits. | - IAC gets only the forward-order bits.<br>- IAP gets payments for both the forward-order bits and for the reverse-order bits. | Same as above. |
| ≥1 AND <N | - IAP gets payments for both the forward-order bits and for the reverse-order bits, minus a penalty (this is defined in the smart contract).<br>- IAC gets both transferred bits and the corresponding reverse order bits. | - IAC gets only the forward-order bits.<br>- IAP gets payments for both the transferred bits and for the reverse-order bits. | Same as above. |

FIG. 12

PROTECTION OF CONFIDENTIALITY, PRIVACY AND FINANCIAL FAIRNESS IN A BLOCKCHAIN BASED DECENTRALIZED IDENTITY MANAGEMENT SYSTEM

BACKGROUND

The present invention relates to the field of blockchains, and particularly to blockchains that support the exchange of identity assets. Still more particularly, the present invention relates to improving blockchains' confidentiality during the exchange of identity assets.

SUMMARY

In one or more embodiments of the present invention, a processor-implemented method improves security in a blockchain network of devices, which supports a blockchain, by protecting security, privacy, financial fairness and secure transfer of identity assets. An identity asset provider device creates an identity asset related to an entity, where the identity asset provider device is utilized by an identity asset provider of the identity asset. The identity asset provider device creates a provider key, which is composed of multiple bits. The identity asset provider device sets a full price for the provider key. The full price is for all of the multiple bits that make up the provider key. The identity asset provider device encrypts the identity asset with the provider key in order to generate an encrypted version of the identity asset. The identity asset provider device transmits, to an identity asset consumer device, a first bit of the provider key, encrypted with a key agreed upon with the identity asset consumer device, and a proof of correctness for the first bit of the provider key. The identity asset provider device receives a blockchain key from the blockchain network of devices, and double encrypts the last bit, first with the key agreed upon with the identity consumer device, and then with the blockchain key in order to create a last encrypted bit. The identity asset provider device transmits, to the blockchain network of devices, the last encrypted bit and the proof of correctness for the last bit of the provider key. The identity asset provider device then transfers, to the identity asset consumer device, subsequent bits from the provider key, encrypted with the key agreed upon with the identity consumer device along with proofs of correctness for the subsequent bits, until n/2 number of subsequent bits are transferred (where n is the total number of bits in the provider key), double encrypts the corresponding reverse order bits (i.e., if the position of the bit in the provider key that is being transferred to the identity consumer device in the current round is: i, the reverse order bit is: n−i) from the provider key, first with the key agreed upon with the identity consumer device and then with the blockchain key to create encrypted subsequent bits from the provider key. The identity asset provider device transmits, to the blockchain network of devices, the encrypted reverse order subsequent bits and proofs of correctness for the encrypted reverse order subsequent bits. If one of the parties aborts the protocol before the protocol completes, one or more processors in the blockchain network of devices then determine how to ensure financial fairness to both parties based on a set of pre-defined rules.

In one or more embodiments of the present invention, a processor-implemented method improves security in a blockchain network of devices, which supports a blockchain, by protecting security, privacy, ownership assurance, and secure transfer of identity assets. An identity asset provider device creates an identity asset related to an entity, where the identity asset provider device is utilized by an identity asset provider of the identity asset. The identity asset provider device creates a provider key, which is composed of multiple bits. The identity asset provider device sets a full price for the provider key. The full price is for all of the multiple bits that make up the provider key. The identity asset provider device encrypts the identity asset with the provider key in order to generate an encrypted version of the identity asset. The identity asset provider device transmits, to an identity asset consumer device, a first bit of the provider key and a proof of correctness for the first bit of the provider key. The identity asset provider device receives a blockchain key from the blockchain network of devices, and encrypts the first bit with the blockchain key in order to create a first encrypted bit. The identity asset provider device transmits, to the blockchain network of devices, the first encrypted bit and the proof of correctness for the first bit of the provider key. The identity asset provider device then transfers, to the identity asset consumer device, subsequent bits from the provider key along with proofs of the subsequent bit, and encrypts the subsequent bits from the provider key with the blockchain key to create encrypted subsequent bits from the provider key. The identity asset provider device transmits, to the blockchain network of devices, the encrypted subsequent bits and a proof of correctness for the subsequent bits. One or more processors then determine whether the subsequent bits exceed a predetermined quantity of bits and then adjust, based on whether the subsequent bits exceed the predetermined quantity of bits, a payment for the provider key, which can be used to decrypt the entity asset.

The described inventions may also be implemented in a computer system and/or as a computer program product.

BRIEF DESCRIPTION OF THE DRAWINGS

FIG. 2 illustrates exemplary use cases for the present invention;

FIG. 3 depicts an exemplary identity asset in accordance with one or more embodiments of the present invention;

FIGS. 11A-11C depict Protocol 4, which is used for assuring financial fairness when transferring an identity asset in accordance with one or more embodiments of the present invention;

FIG. 12 depicts an exemplary embodiment of the present invention for assuring financial fairness through the use of a bit-by-bit transfer of a decryption key used to decrypt an encrypted identity asset;

DETAILED DESCRIPTION

Figure 1:
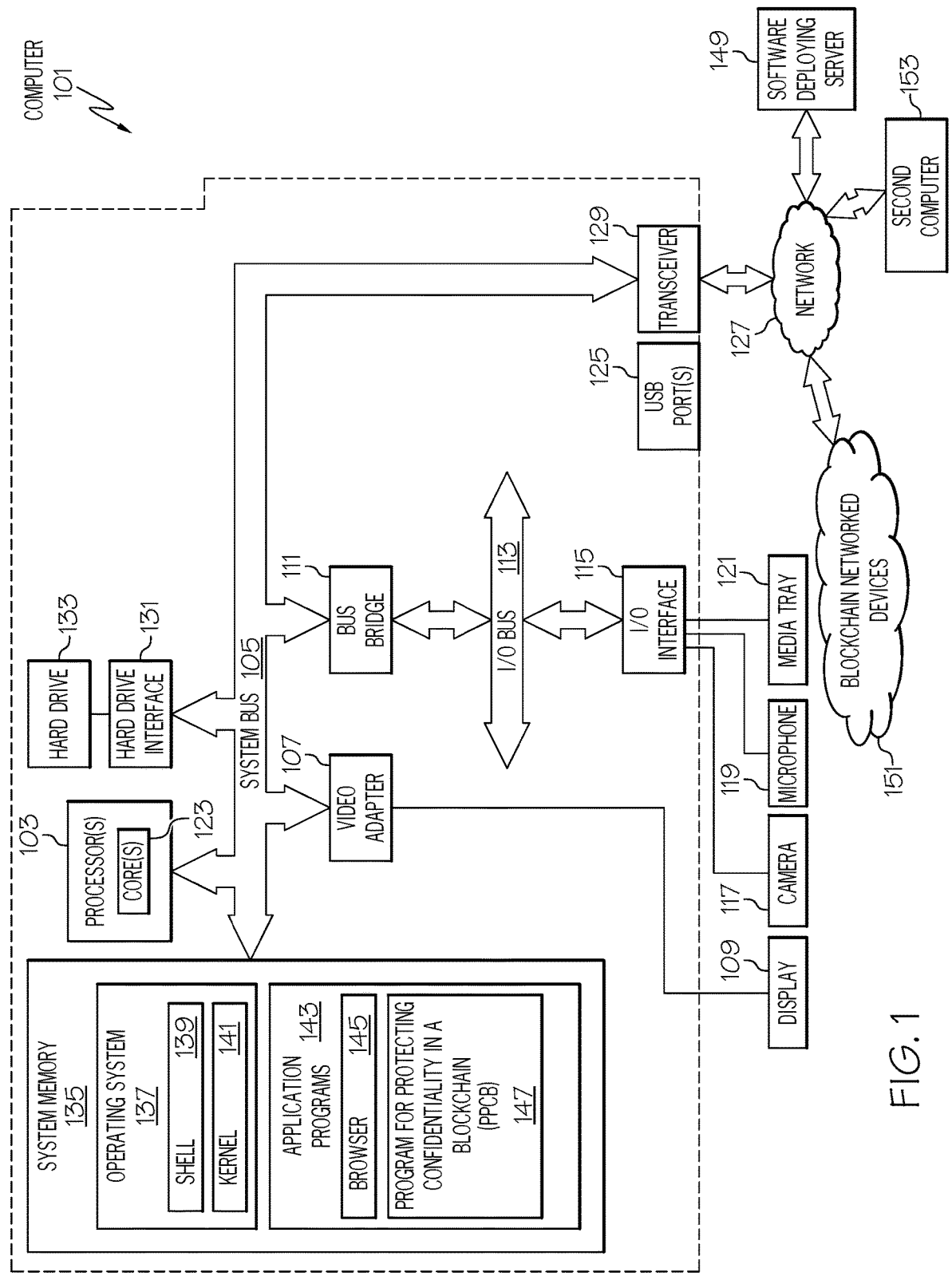
FIG. 1 depicts an exemplary system and network in which the present disclosure may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or blockchain networked devices 151 and/or a second computer 153 shown in FIG. 1.

Exemplary computer 101 includes one or more processor(s) 103 that are coupled to a system bus 105. Processor(s) 103 may each utilize one or more core(s) 123, which contain execution units and other hardware beyond that found in the rest of the processor(s) 103 (e.g., on-board random access memory, etc.). A video adapter 107, which drives/supports a display 109 (which may be a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a camera 117, a microphone 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems, such as blockchain networked devices 151, using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Program for Protecting Confidentiality in a Blockchain (PPCB) 147. PPCB 147 includes code for implementing the processes described below, including those described in FIGS. 2-18. In one embodiment, computer 101 is able to download PPCB 147 from software deploying server 149, including in an on-demand basis, wherein the code in PPCB 147 is not downloaded until needed for execution. In one embodiment of the present invention, software deploying server 149 performs all of the functions associated with the present invention (including execution of PPCB), thus freeing computer 101 from having to use its own internal computing resources to execute PPCB 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

A digital asset (also referred to herein as an identity asset and a digital identity asset) is defined as digital information about a user and that identifies the user. Examples of a digital identity asset include, but are not limited to, financial information about the user, personal information about the user, consumer information about the user, etc. Digital identity assets describing users can be shared between parties in a digital identity ecosystem (e.g., identity providers and identity consumers), but only after the users (including the entity that is described by the digital identity asset) expressly provide their permission to do so.

As described herein, an identity provider and the identity consumer may exchange digital identity assets of a user that approves of the exchange. As part of digital identity management, the exchange preferably is anonymous. That is, the identity provider and identity consumer preferably stay anonymous to each other as well as to any party observing the transaction, except the user whose identity being exchanged. These anonymous identity exchange transactions also preferably are unlinkable. That is, multiple transactions exchanging the same identity asset of a given user should not be able to be linked. There might also be the requirement of making a monetary payment by the identity consumer to the identity provider, in exchange of the identity asset. In this context, there are certain threats to the financial fairness for the two exchanging parties because one of the two anonymous parties can abort the protocol after receiving what they expect and without giving out what they owe.

The present invention presents one or more solutions to these problems, which in one or more embodiments involves a protocol for ensuring financial fairness to both parties, without affecting the anonymity and unlinkability properties of the identity exchange transactions.

In one or more embodiments, the present invention is utilized in an identity ecosystem that is operated on a trusted and decentralized identity platform backed by blockchain technology.

Users consume services from different service providers on a day-to-day basis, and access to such services are controlled by various identity verification processes. Some of these identity verification processes not only ask for individual pieces of identity information of a user such as email address, Social Security Number, passport number etc., but also require the user to go through certain due diligence processes in order to fulfill certain compliance requirements, such as Know Your Customer (KYC) compliance in the banking/financial sector, as well as to get to know the customer better.

Example scenarios and a sample identity verification and due diligence checklist associated with them are shown in Table 202 in FIG. 2, which shows example scenarios and associated sample identity verifications and due diligence checklists.

In the scenarios shown in Table 202, users must produce the required proofs of documents, fill out lengthy forms, visit the verifier in-person and wait for a considerable amount of time for the verification to go through. On the other hand, service providers also spend time and resources in performing these identity verification and due diligence steps. Once these identity verification/due diligence steps are performed with regard to a particular individual, the packages of information that result from such processes become the service providers' assets, which are referred to herein as identity assets. Examples of such identity assets are shown in FIG. 3 as exemplary identity asset 301, which is part of a KYC verification for a user named "Bob", as required in Use Case 1 in Table 202 from FIG. 2. Note that the entity (e.g., a bank) has invested a significant amount of resources (computer time, computer resources, electricity, personnel time, etc.) to create the identity asset 301. Nonetheless, since the identity asset 301 contains information about the user (Bob), the user has the right to request control over such an identity asset being held at different organizations/enterprises.

Previously, when the same individual(s) need to consume a similar service from another service provider, (e.g., consuming financial services in a different bank, joining another employer, applying for a visa in a different country, etc.), he/she is treated as a completely unrecognized person to the other service provider (i.e., he/she is a complete "stranger" to the other service provider), and is required to go through a similar verification/due diligence process again from the beginning with the second service provider. These repeated processes are expensive in terms of money, time, resources, etc. Since these lengthy processes are error-prone as well as time consuming, they also lead to frustrations and unsatisfactory user experiences.

Thus, one or more embodiments of the present invention present a process through which different service providers exchange aforementioned identity assets (the outcome of specialized identity verification and due diligence processes), in a decentralized manner (i.e., without involving a trusted central party), thus saving time and money, while also avoiding errors and frustrations. Specifically, one or more embodiments of the present invention optimize security and privacy provided by a blockchain environment when exchanging/sharing identity assets. In one or more embodiments, the initial service provider who actually performed the identity verification/due diligence process for the user (in order to create the identity asset), is motivated to share the identity asset (with the user's express permission) by being paid compensation from the enterprise/entity that is requesting the identity asset. It is to be understood that privacy of the user (i.e., protecting confidential information of the user, such as sensitive information about the user's identity and the transactions that the user performs) is to be protected whenever such an identity asset is exchanged. The present invention provides such an assurance through the novel use of a blockchain, which is described in detail below.

For explanatory purposes, Use Case 1 from table 202 is FIG. 2 will be used to describe the present invention. It is understood that other scenarios may also use the present invention.

Use Case 1: Bob first consumes financial services from bank A, where he performs identity verification and due diligence steps for KYC (know-your-customer) compliance. Later Bob needs to consume financial services from bank B as well. At this point, both Bob and bank B wants to know if Bob has already gone through such a process and if so, they would like to re-use the identity assets created during the initial process.

In this Use Case 1, although Bob would like to re-use the identity asset created at bank A when interacting with bank B, Bob would not like to reveal to bank B which bank(s) Bob has interacted with before. In the same way, Bob would not like to reveal to bank A, which bank(s) Bob is planning to be a customer of. Bank A and bank B themselves would also not like to reveal their identities to each other during the identity asset exchange, due to business competition. Therefore, the anonymity of the parties who exchange the identity asset is a key privacy requirement. On the other hand, Bob would not like the transactions he carries out (with different banks based on the same identity asset) to be linkable by anyone except bank A, who is providing the identity asset. Therefore, unlinkability of the transaction is another key privacy requirement that the improvements to the blockchain described herein achieve.

As just stated, a preferred embodiment of the present invention utilizes a blockchain. Exemplary blockchains are described now in FIGS. 4-6.

Figure 4:
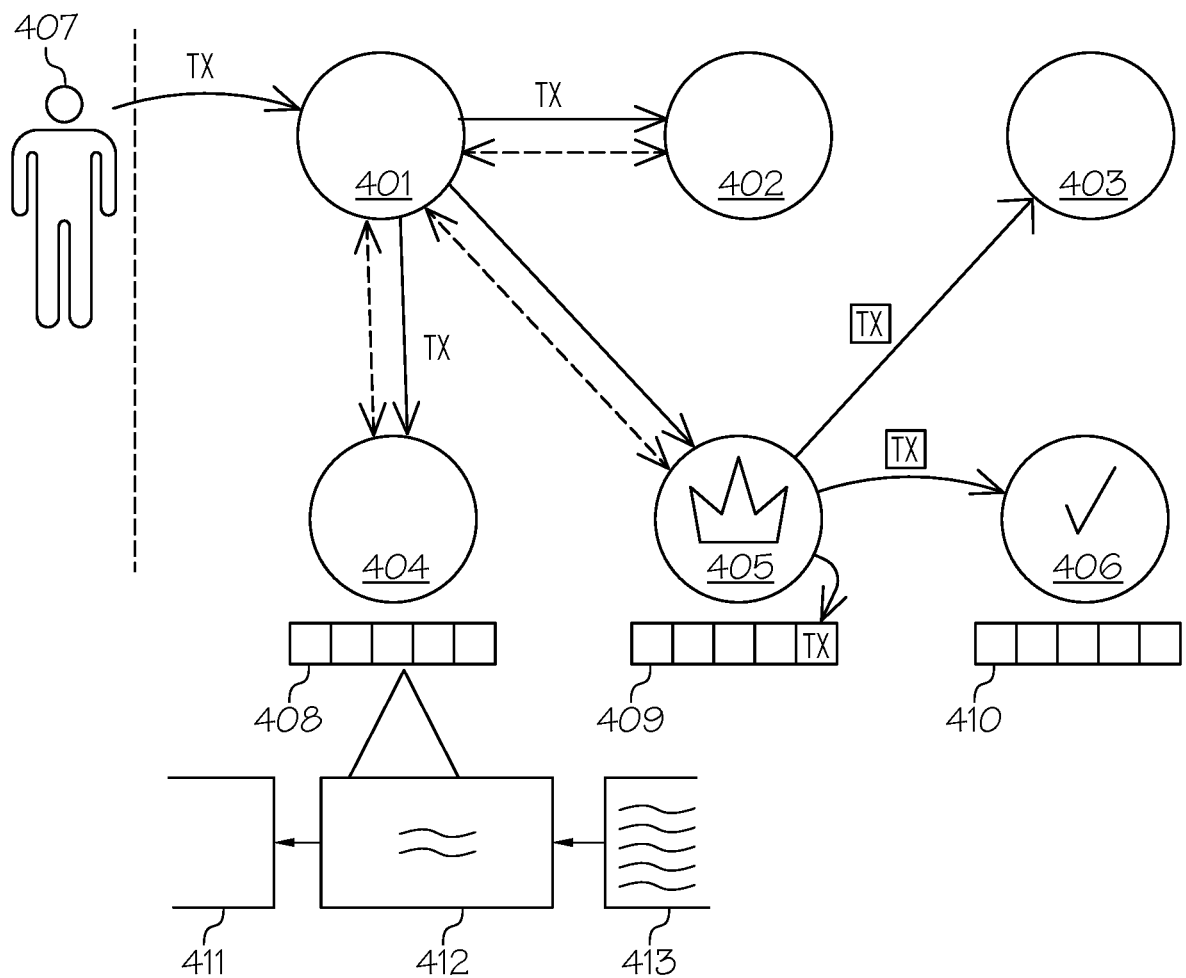
FIG. 4 depicts an exemplary blockchain architecture as used in one or more embodiments of the present invention.

With reference now to FIG. 4, an illustration of exemplary blockchains as used in one or more embodiments of the present invention is presented. As shown in FIG. 4, computers 401, 402, 403, 404, 405, and 406 represent an exemplary peer-to-peer network of devices used to support a peer blockchain (in which more or fewer computers/machines may form the peer-to-peer network of devices). Each of the computers 401, 402, 403, 404, 405 and 406 (which may be telecommunication devices, portable computers, servers, etc.) in the peer-to-peer network has a same copy of data (e.g., data that represents transaction events), as held in ledgers stored within the depicted blockchains 408, 409, 410 that are associated with respective computers 404, 405, 406.

As shown in FIG. 4, a client 407 (e.g., a computer) sends a transaction Tx (e.g., an event that occurred with the client 407) to the client's peer (depicted as computer 401). Computer 401 then sends the transaction Tx to ledgers known as the depicted blockchains 408, 409, 410 that are associated with other peers, including the depicted computers 402, 404, 405.

Blocks within exemplary blockchain 408 are depicted as block 411, block 412, and block 413. Block 413 is depicted as a newest entry into a ledger held in blockchain 408, and includes not only the newest transactions but also a hash of the data from the older block 412, which includes a hash of the even older block 411. Thus, older blocks are made even more secure each time a new block is created, due to the hashing operations.

As shown in FIG. 4, computer 405 has been designated as a leader peer according to a consensus model of the peer-to-peer network. In order to be designated as the leader peer, computer 405 has to be the first to "guess" what the data in Tx is. That is, computer 401 encrypted Tx with a known one-way encryption algorithm (e.g., Secure Hash Algorithm 2—"SHA-2"). Since this is a one-way encryption algorithm, there is no way to know what was used as the input by simply reverse-engineering the encryption. However, blockchain protocols require that the leading bits in the encrypted (hashed) data follow a certain pattern, such as eight leading zeros followed by other bits (e.g., "00000000xxxxxxxxxxxx"). Thus, computer 405 simply used brute force to input many combinations of data into the SHA-2 algorithm until an output of "00000000xxxxxxxxxxxx" is achieved. Since the first eight bits were correct ("00000000"), then there is an assumption that the other bits ("xxxxxxxxxxxx") are also correct, since the odds of getting "00000000" correct but not getting "xxxxxxxxxxxx" are extremely small. Note that while computer 405 is working on this problem (of guessing what the input data to the SHA-2 algorithm by computer 401 is), other computers such as computers 401-404 and 406 are also working on the problem.

Assume now that computer 405 won the "race" to decrypt Tx before computers 401-404 and 406. Thus, computer 405 will send the data ("00000000xxxxxxxxxxxx") in a newly-encrypted form (using a key provided by computer 401) to one or more of computers 401-404 and 406. One or more of computers 401-404 and 406 will then check computer 405's work. For example, assume that Tx described client 407 spending $100.00. If the blockchain ledger shows that client 407 only has $80.00, then one or more of the computers 401-404 and 406 will assume that computer 405 did not accurately decrypt Tx. However, if the blockchain ledger shows that client 407 has $200.00, then one or more of the computers 401-404 and 406 will assume that computer 405 accurately decrypted Tx as being $100.00. Once a predefined quantity of peer computers from computers 401-404 and 406 agree that the decrypted value of Tx is correct, then computer 405 will be designated as the leader peer for Tx, and will be compensated (e.g., in money) for its use of computing resources. That is, the nodes/computers that receive the new block/transaction (Tx) then attempt to validate the new block/transaction. If enough (i.e., some predefined quantity/percentage) of the nodes/computers validate the new block/transaction, then the new block/transaction is deemed valid for the entire peer-to-peer network of computers 401-406 and is added to the blockchains (including the depicted blockchains 408, 409, 410) associated with all of the nodes/peers/computers 401-406.

As such, the leader peer (computer 405) organizes all transactions from the nodes/peers/computers/telecommunication devices 401-406, and then shares new blocks/transactions (Tx) with other nodes (e.g., computers 403, 406) as depicted.

In one or more embodiments of the present invention, the blockchains (including the depicted blockchains 408, 409, 410) are "anchored" to a particular user by adding to the block/transaction information such as that shown in table 202 in FIG. 2 as well as the particular user's name ("Bob").

Figure 5:
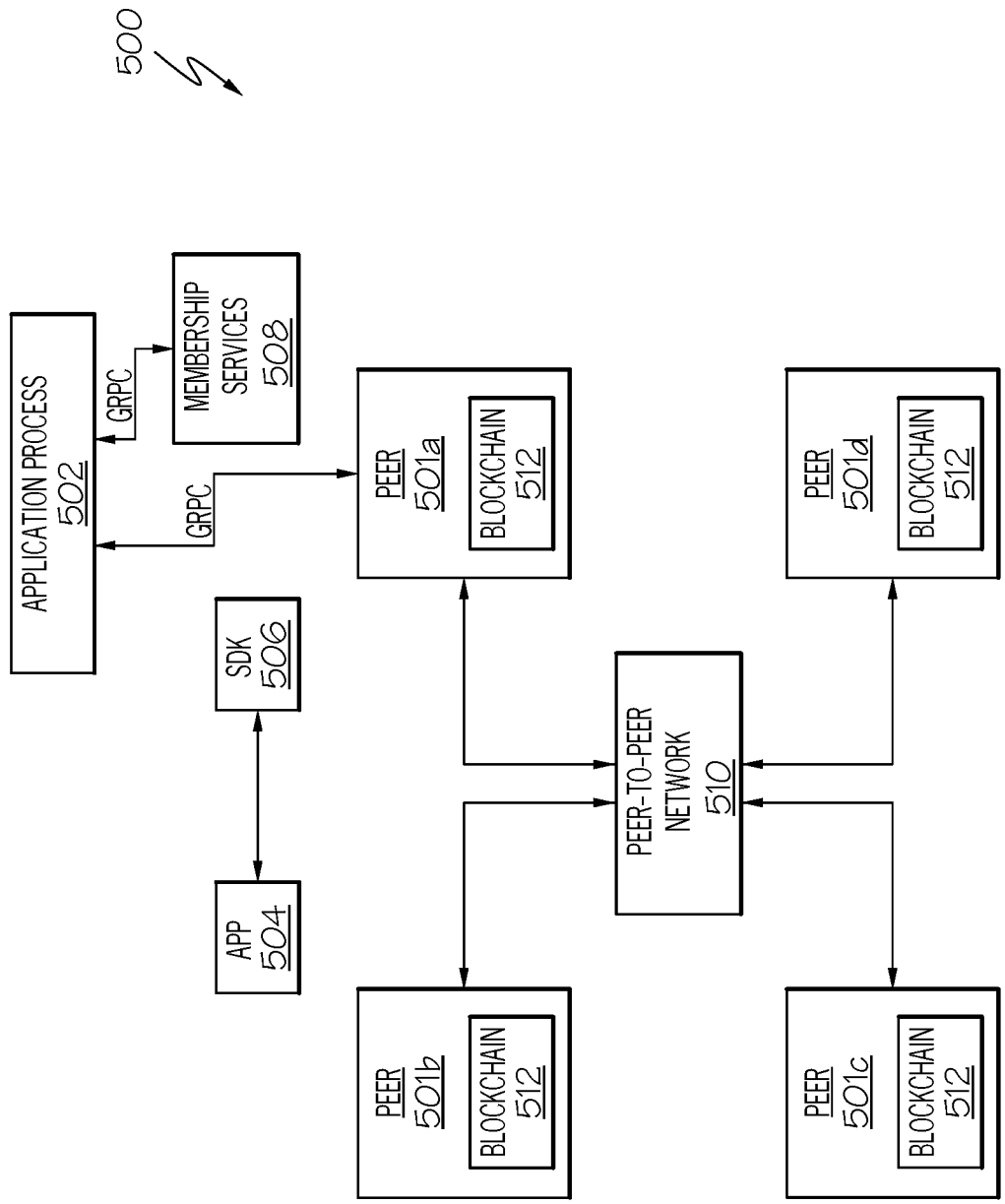
FIG. 5 illustrates additional detail of an exemplary blockchain topology as used in one or more embodiments of the present invention.
Figure 6:
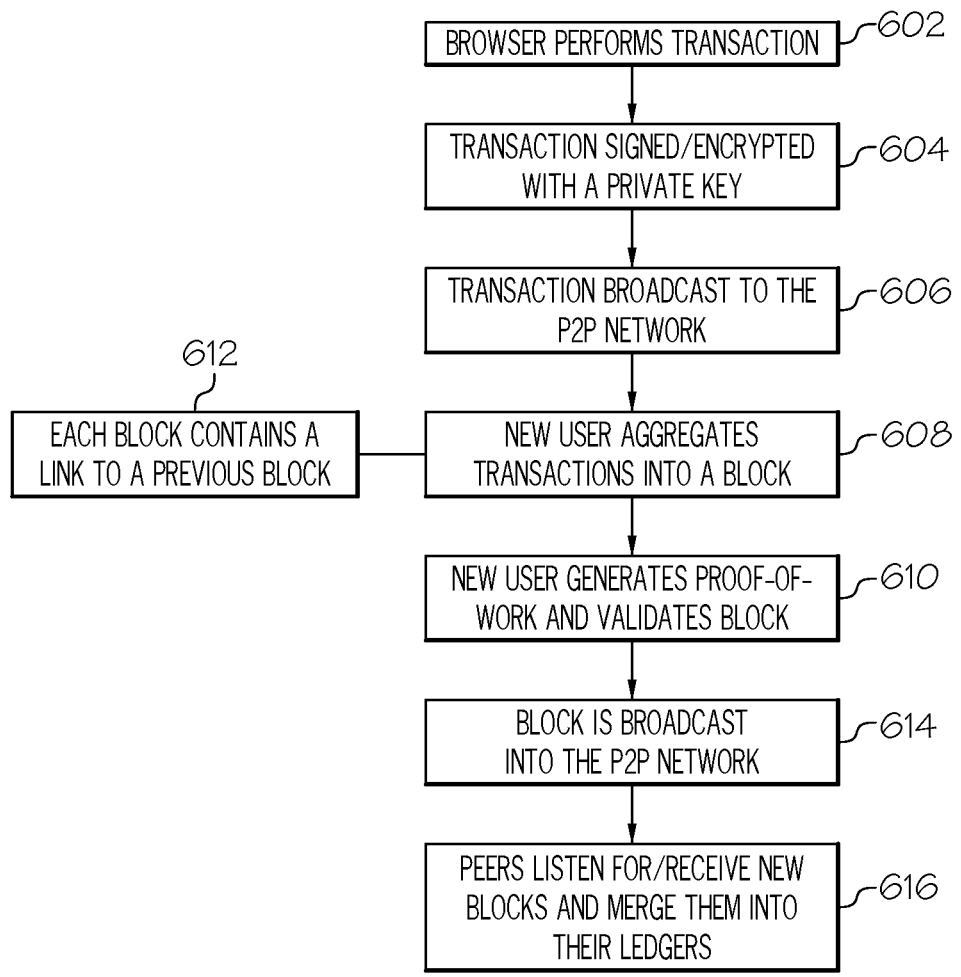
FIG. 6 depicts a high-level use of a blockchain in accordance with one or more embodiments of the present invention.

With reference now to FIGS. 5-6, additional detail of a blockchain and its operation as used by the present invention is presented.

In one or more embodiments of the present invention, a blockchain fabric, such as blockchain fabric 500 depicted in FIG. 5, is used to provide the infrastructure (e.g. execution of the chaincodes) and services (e.g., Membership services such as Identity management) for securely and transparently storing, tracking and managing transactions on a "single point of truth". The blockchain fabric 500 maintains a verifiable record (of the single point of truth) of every single transaction ever made within the system. Once data are entered onto the blockchain, they can never be erased (immutability) or changed. That is, a change to a record would be regarded as issuing/introducing a new transaction. Prohibition of such thus ensures auditability and verifiability of data.

The blockchain fabric 500 (also known as the "blockchain system", "open blockchain" or "hyperledger fabric") is based on a distributed database of records of all transactions or digital events that have been executed and shared among participating parties. An individual transaction in the blockchain is validated or verified through a consensus mechanism incorporating a majority of the participants in the system. This allows the participating entities to know for certain that a digital event happened by creating an irrefutable record in a permissioned public ledger.

When a transaction is executed, its corresponding chaincode is executed by several validating peers of the system. For example, as shown in FIG. 5, peers 501a-501d (i.e., other computers, servers, etc.) establish the validity of the transaction parameters and, once they reach consensus, a new block is generated and appended onto the blockchain network. That is, an application process 502 running on a client (e.g., client 407 shown in FIG. 4) executes an application such as the depicted App 504, causing a software development kit (SDK) 506 to communicate using general remote procedure calls (grpc) to membership services 508 that support the peer-to-peer network 510 that supports the blockchain 512 using the peers 501a-501d.

Exemplary operation of the open blockchain fabric 500 shown in FIG. 5 is presented in FIG. 6. As described in step 602, a browser (e.g., on client 407 shown in FIG. 4) performs a transaction (e.g., creating a new feature on an identity asset). As shown in step 604, the client signs and encrypts the transaction with a private key, such as SHA-2. This SHA-encrypted transaction is then broadcast to the peer-to-peer network 510, as described in step 606. A new user (e.g., peer 501c) aggregates the transaction(s) into blockchain 512, as shown in step 608. As shown in link 612, each block contains a link to a previous block. The newly-revised blockchain 512 is validated by one or more of the other peers in peers 501a-501d (step 610), and is then broadcast to the peers 501a-501b and peer 501d, as described in step 614. These peers 501a-501b and peer 501d listen for and receive the new blocks and merge them into their copies of blockchain 512 (step 616).

Thus, the open blockchain fabric 500 shown in FIG. 5 is a blockchain deployment topology that provides a distributed ledger, which persists and manages digital events, called transactions, shared among several participants, each having a stake in these events. The ledger can only be updated by consensus among the participants. Furthermore, once transactions are recorded, they can never be altered (they are immutable). Every such recorded transaction is cryptographically verifiable with proof of agreement from the participants, thus providing a robust provenance mechanism tracking their origination.

As such, a blockchain fabric uses a distributed network to maintain a digital ledger of events, thus providing excellent security for the digital ledger, since the blockchain stored in each peer is dependent upon earlier blocks, which provide encryption data for subsequent blocks in the blockchain.

That is, the open blockchain fabric 500 provides a decentralized system in which every node in a decentralized system has a copy of the blockchain. This avoids the need to have a centralized database managed by a trusted third party. Transactions are broadcast to the network using software applications. Network nodes can validate transactions, add them to their copy and then broadcast these additions to other nodes. However, as noted above, the blockchain is nonetheless highly secure, since each new block is protected (e.g., encrypted) based on one or more previous blocks.

In one or more embodiments of the present invention, a new and novel protocol for anonymous and unlinkable identity asset exchange is utilized, as described in further detail below. In this protocol, an identity asset provider (e.g., bank A) and the identity asset consumer (e.g., bank B) exchange the identity asset of the user anonymously, in a decentralized identity management platform backed by a blockchain network. Carrying out the identity asset exchange transactions over the decentralized and trusted identity platform backed by blockchain eliminates the requirement of a trusted third party. However, in this protocol alone, there could be threats to the ownership of the identity asset being exchanged, due to the anonymity of the parties involved. As such, the present invention defines the owners of the identity asset as both the user and the identity provider, although the identity asset is usually held at the identity provider. Thus, only the original owners of the identity asset are able to legitimately transfer the identity asset to an identity consumer.

Two assumptions related to the context in which this protocol is used are:

1) There is a standard format for an identity asset used for a particular identity verification scenario (e.g., KYC compliance verification in banks) that all parties agree on. Therefore, if multiple copies of a particular type of identity asset are created using the identity information of a given user by multiple parties, all of them would result in identical identity assets.

2) If a particular type of identity asset used for a particular identity verification scenario (e.g., KYC compliance verification in banks) is created by one identity provider (e.g., bank A), then other organizations who need to use such an identity asset of the user should re-use the already created identity asset, without re-creating it.

Figure 7:
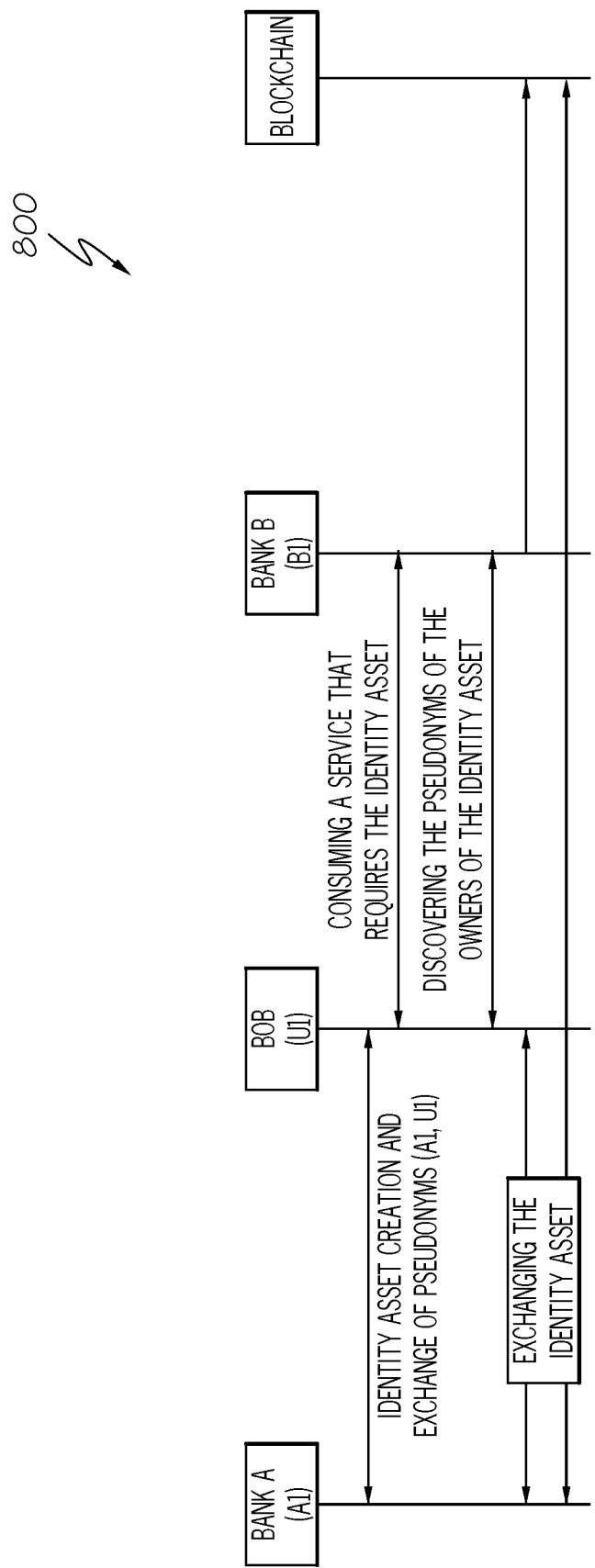
FIGS. 7-10 illustrate an exemplary bank use case in accordance with one or more embodiments of the present invention.

In FIG. 7, a high-level overview of the protocol presented herein to address the threats to ownership assurance caused by the three collusion attacks listed above is presented in chart 800.

Figure 8:
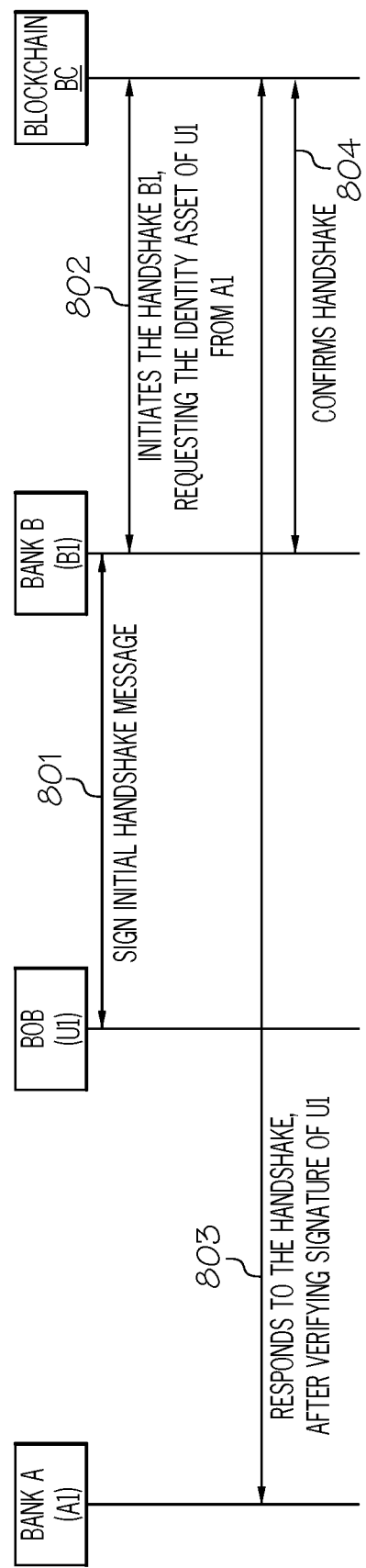
Figure 9:
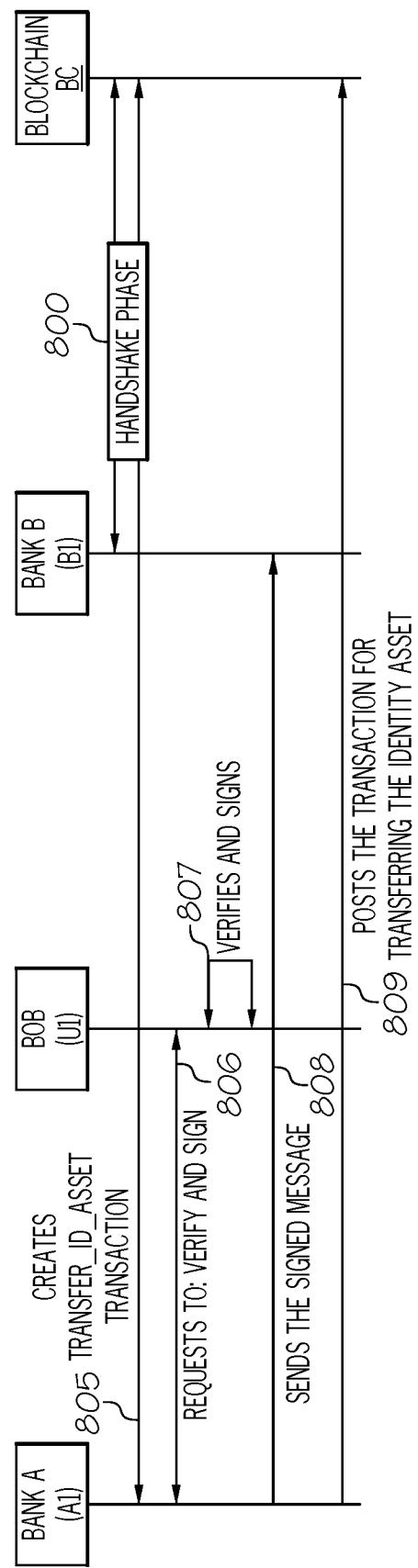
Figure 10:
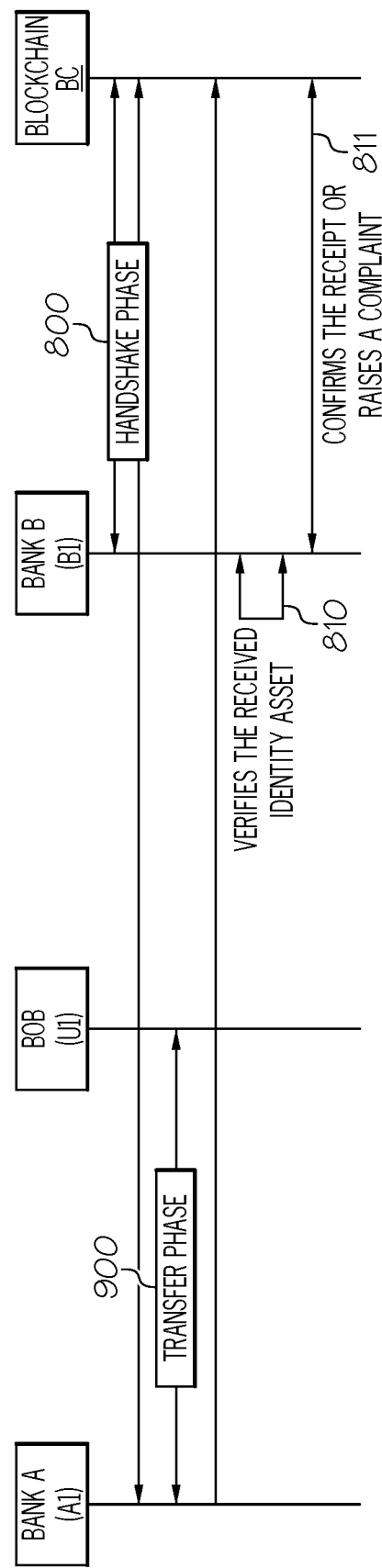

With reference now to FIGS. 8-10, a preliminary protocol is described as used in one or more embodiments of the present invention.

As shown in FIG. 8, the initial signed handshake message is signed by Bob and bank B (the identity consumer in the exemplary usecase) who are appearing with pseudonyms: U1 and B1 respectively, as shown in step 901. As shown in step 802, B1 initiates a handshake, by posting the initial handshake message to the blockchain requesting the identity asset for U1 from A1, which is the pseudonym of bank A (the identity provider in this exemplary case). The blockchain broadcasts the initial handshake message to all the participants in the blockchain. Bank A identifies that the message is intended to it, as it is the owner of the pseudonym A1. As shown in step 803, bank A (appearing with pseudonym A1) responds to the initial handshake message (after verifying the signature of U1 and B1 in the initial handshake message), by posting a response handshake message to the blockchain. As shown in step 804, B1, which receives the response handshake message via blockchain, then confirms the handshake by posting a confirm handshake message to the blockchain.

As shown in FIG. 9, once the handshake phase 800 (described in FIG. 8) is completed, A1 creates a transfer id asset transaction (step 805), by encrypting the user's identity asset with a key known to B1, and then requests U1 to verify and sign the transfer transaction for the user's identity asset (step 806). U1 does so (step 807). A1 then sends the signed message to B1 (step 808). A1 then posts the transaction for transferring the identity asset to BC (step 809).

As shown in FIG. 10, once the handshake phase 800 (described in FIG. 8) and the transfer phase 900 (described in FIG. 9) are complete, B1 verifies the received identity asset from A1 (via BC) by decrypting it, as shown in step 810. As shown in step 811, B1 then confirms receipt of the valid identity asset by posting a confirmation message to blockchain, or else B1 raises a complaint (if the identity asset is not valid) for dispute resolution.

Thus, one or more embodiments of the present invention present a novel scheme that does not require upfront deposits from all the involved parties, but only from the parties who are supposed to make a payment at the end of the protocol, while preserving financial fairness to both the parties. This solution is preferably performed on an identity ecosystem operated on a trusted and decentralized identity platform backed by a permissioned blockchain.

In accordance with one or more embodiments of the present invention, "financial fairness" for the identity asset exchange protocol includes the following features:

The Identity Asset Provider (IAP) preferably does not abort the protocol after receiving the monetary payment from the identity consumer and without giving the identity asset to the identity consumer; and The Identity Asset Consumer (IAC) preferably does not abort the protocol after receiving the identity asset from the IAP and without making the monetary payment to the IAP.

Addressing these two features/requirements is not straight forward, since the two parties appear with pseudonyms. Any party can abort the protocol dishonestly after receiving what they expected, without giving out what they owe to the other party, unless there are proper mechanisms in place to prevent it. Previous works have addressed fairness issues in Secure Multiparty Computation (SMPC) settings by utilizing blockchain technology, such as preserving fairness property amidst dishonest majority in SMPC protocols. The high-level idea to this approach is to require each party to make a monetary deposit with a time lock at the beginning of the protocol. If one party does not respond within the time indicated by the time lock, that party is considered to have aborted the protocol, and that party's deposit is transferred to the other honest parties, in order to ensure fairness in the protocol.

While the aforementioned approach is promising to preserve fairness in protocols that involve multiple parties and where each party's input is important during the computation, there are certain drawbacks in adopting such approach into an identity asset (or any digital asset) exchange protocol carried out between only two parties, like the one described herein.

First, every party, even the ones that are not supposed to make a payment in the traditional transaction settings (e.g., the identity asset provider described herein) would have to make a deposit at the beginning of the transaction.

Second, the penalty for aborting the protocol is enforced at a coarse-grained level (i.e., a party either gets the full deposit back or loses the full deposit). This might not be fair to a party which is aborting due to technical/network issues. Thus, it is difficult to track if a particular party aborted due to dishonesty or due to technical issues. However, the present invention provides a penalty scheme that is enforced at a finer grained level, and thus is fairer to a party aborting due to technical issues, while at the same time penalizing a party which is aborting dishonestly.

Thus, an embodiment of the present invention extends the preliminary anonymous identity asset exchange protocol described above, in order to preserve financial fairness, by utilizing a scheme that enforces a penalty for the aborting party, and yet ensures fairness for the honest party in a fine-grained level, in which the transfer of the secret key and the monetary payment happens bit by bit.

A detailed description of the protocol for preserving financial fairness when transferring identity assets is shown as "Protocol 4" in FIGS. 11A-11C, which describe the inputs to the system, the outputs from the system, and the protocol execution for transferring monetary payment for an identity asset. The protocol for financial fairness is implemented in the handshake phase and the transfer phase of the preliminary anonymous identity exchange protocol (which is described above). Identity Asset Provider is denoted by IAP and Identity Asset Consumer is denoted by IAC. Preferably, the present invention uses zero-knowledge proof systems described herein.

High-level overview of the protocol for preserving financial fairness.

Goal: Introduce a protocol to preserve financial fairness at a finer grained level during the exchange of confidential digital identity asset.

Assumption: Proof system preserves zero knowledge property.

High-level idea:

The identity asset provider encrypts the identity asset using a secret key K and posts the cipher text to the blockchain, once the identity asset provider and the identity asset consumer have performed an anonymous handshake to agree upon the exchange of the identity asset.

The identity asset provider also posts a commitment on the key K to the blockchain.

Let $b_1, b_2, \ldots b_n$ be the bits of the key K.

Let E be an additive homomorphic encryption scheme whose public key is known to everyone, but that the peers in the blockchain may decrypt (using the public key) only if at least t+1 of them cooperate.

Let K' be a secret key known only to the identity asset provider and the identity asset consumer (which they can share during the handshake phase of the protocol described herein).

Then the identity asset provider transfers the secret key K to the identity asset consumer on a bit by bit basis (each bit is encrypted using key K'), via blockchain.

When the identity asset provider transfers the ith bit, if i≤n/2, it also posts the corresponding bit in the reverse order: (n−i)th bit to the blockchain. These reverse order bits are double encrypted: first, using key K' and second, using E, for the purpose of fairness (i.e., to protect from the following—if the provider aborts the protocol before transferring all the bits, the blockchain peers may work together, decrypt the reverse order bits, and hand them over to the identity asset consumer).

The identity asset consumer pays the identity asset provider via the blockchain with time-locked payments with conditions specified, for each of the bits transferred. These time-locked payments with conditions specified, may be redeemed by the identity asset provider only if the identity asset provider has fulfilled the conditions specified during the protocol, because the blockchain peers verify whether the conditions are met when the identity asset provider tries to redeem the payments and approve or reject the redemption accordingly. The conditions to be fulfilled maybe implemented as part of the smart contracts in the Blockchain network so that such conditions may be validated by them.

Distribution of money over the bits is agreed by the two parties (the identity asset provider and the identity asset consumer) beforehand (i.e.: during the handshake phase). For simplicity, a uniform distribution of the bits is assumed.

If both parties execute the protocol successfully, the identity asset provider gets the money from the payments that the identity asset consumer made during the protocol and the identity asset consumer gets all the bits of the key K.

If either party aborts the protocol in the middle, then that party receives the penalty based which bit was transferring when the party aborted the protocol, while ensuring maximum fairness to the other party (see the rules shown in table 1200 in FIG. 12).

Figure 13:
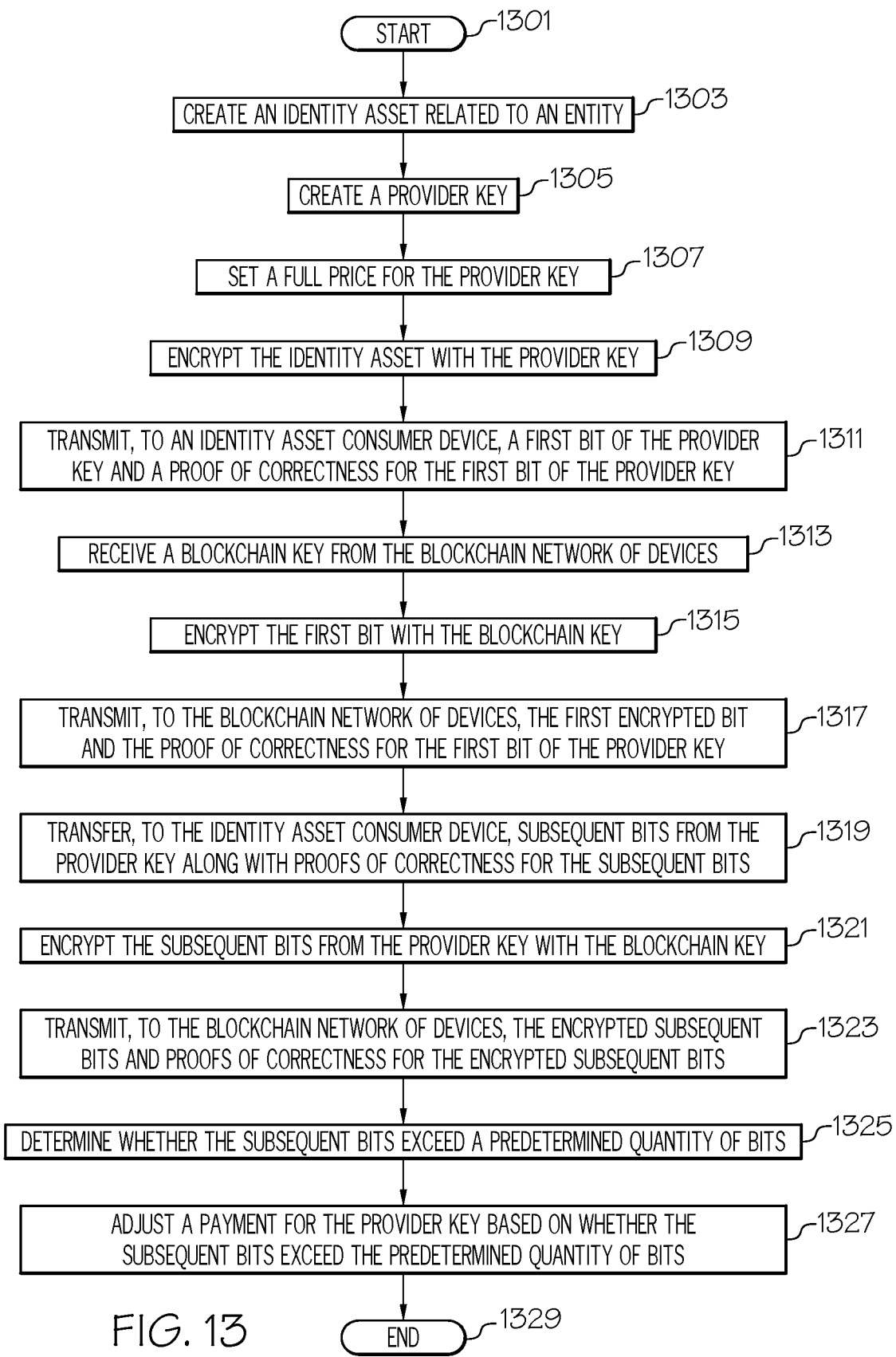
FIG. 13 is a high-level flow-chart of one or more steps performed in a processor-based method in accordance with one or more embodiments of the present invention.
Figure 14:
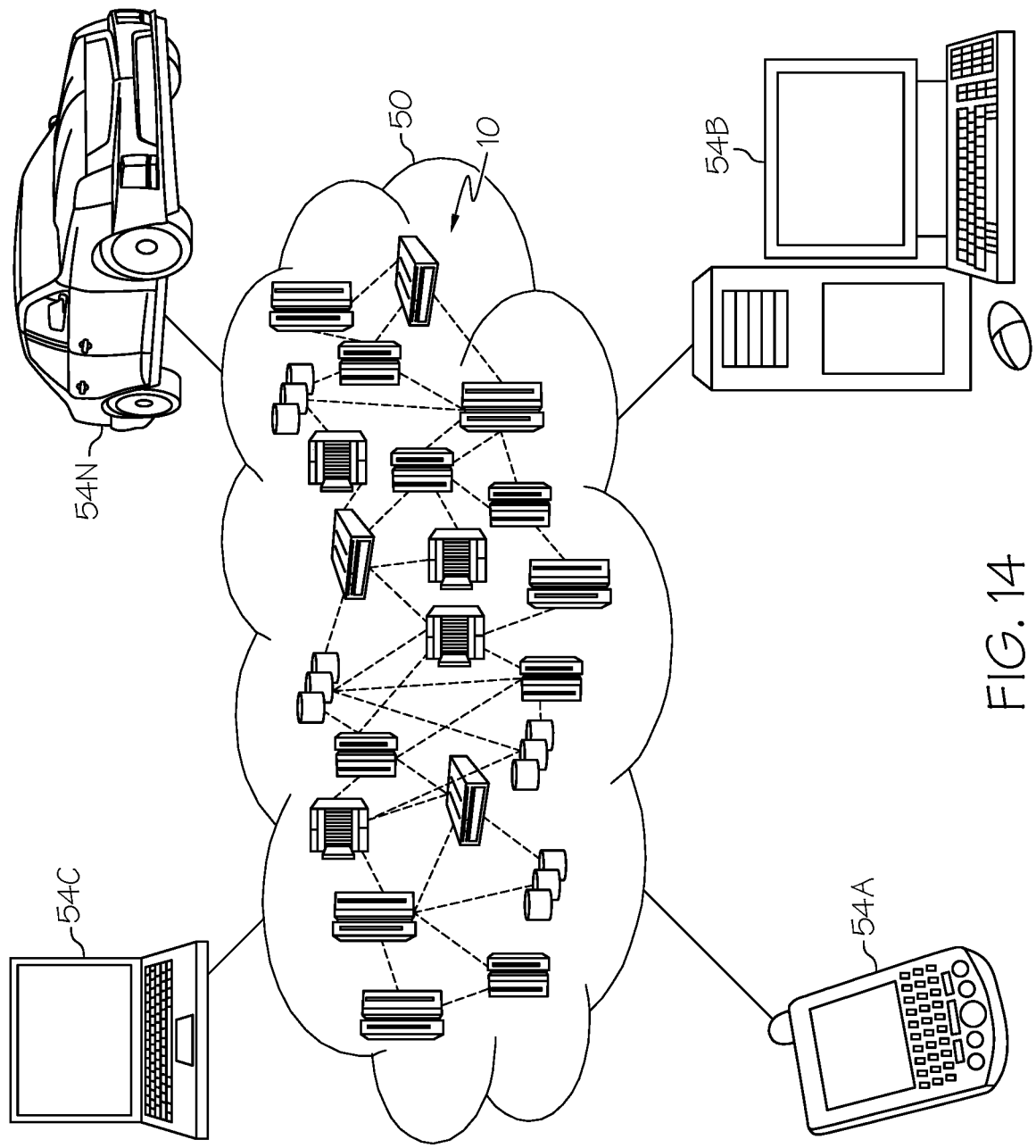
FIG. 14 depicts a cloud computing environment according to an embodiment of the present invention.

With reference now to FIG. 13, a high-level flow chart of one or more embodiments of the present invention, as performed by an identity asset provider device, is presented. That is, FIG. 14 depicts exemplary technology-based steps for improving security and equitable financial fairness in a blockchain network of devices that supports a blockchain.

After initiator block 1301 and as described in block 1303, an identity asset provider device (e.g., computer 101 shown in FIG. 1) creates an identity asset related to an entity, where the identity asset provider device is utilized by an identity asset provider of the identity asset.

As described in block 1305, the identity asset provider device creates a provider key that is composed of multiple bits.

As described in block 1307, the identity asset provider device sets, either on its own or in an agreement with an identity asset consumer device, a full price for the provider key, where the full price is for all of the multiple bits that make up the provider key.

As described in block 1309, the identity asset provider device encrypts the identity asset with the provider key in order to generate an encrypted version of the identity asset. The encrypted version of the identity asset may be stored within the identity asset provider device, or (preferably) within a set of blockchain networked devices (e.g., blockchain networked devices 151 shown in FIG. 1), which acts at an escrow for the identity asset, bit-by-bit payments made, etc.

As described in block 1311, the identity asset provider device transmits, to an identity asset consumer device (e.g., the second computer 153 shown in FIG. 1), a first bit of the provider key and a proof of correctness for the first bit of the provider key.

As described in block 1313, the identity asset provider device receives a blockchain key from the blockchain network of devices.

As described in block 1315, the identity asset provider device encrypts the first bit with the blockchain key in order to create a first encrypted bit.

As described in block 1317, the identity asset provider device transmits, to the blockchain network of devices, the first encrypted bit and the proof of correctness for the first bit of the provider key.

As described in block 1319, the identity asset provider device transfers, to the identity asset consumer device, subsequent bits from the provider key along with proofs of correctness for the subsequent bits.

As described in block 1321, the identity asset provider device encrypts the subsequent bits from the provider key with the blockchain key to create encrypted subsequent bits from the provider key.

As described in block 1323, the identity asset provider device transmits, to the blockchain network of devices, the encrypted subsequent bits and proofs of correctness for the encrypted subsequent bits.

As described in block 1325, one or more processors (within the computer 101 and/or the blockchain networked devices 151 and/or the second computer 153 shown in FIG. 1) determine whether the subsequent bits exceed a predetermined quantity of bits.

As described in block 1327, the one or more processors then adjust a payment for the provider key based on whether the subsequent bits exceed the predetermined quantity of bits.

The flow chart ends at terminator block 1329.

In an embodiment of the present invention, the processor-implemented method includes the further step of posting, by the identity asset provider device, the encrypted version of the identity asset on the blockchain. That is, the encrypted version of the identity asset is stored as a transaction in the blockchain.

In an embodiment of the present invention, the identity asset consumer device deposits a payment for each delivered bit of the provider key to an escrow account managed by the blockchain network of devices. That is, every time a bit from the identity asset provider's key is sent to the identity asset consumer, a bit-by-bit payment is recorded in the blockchain network of devices.

In an embodiment of the present invention, the payment for the provider key is the full price if all of the multiple bits in the provider key are delivered to the identity asset consumer device, and the processor-implemented method further includes: retrieving, by the identity asset consumer device, the encrypted version of the identity asset on a blockchain; and decrypting, by the identity asset consumer device, the encrypted version of the identity asset by using all of the multiple bits in the provider key. That is, once the identity asset consumer device has a full version of the provider key, it can retrieve (e.g., from the blockchain) the encrypted identity asset, and decrypt it using the provider key.

Thus, if one of the parties aborts the protocol, what each party gets is determined by the rules listed in a table at the end of the sent document. (See FIG. 12.)

In an embodiment of the present invention, the payment for the provider key is a portion of the full price if the subsequent bits that are delivered to the identity asset consumer device exceed the predetermined quantity of bits but are less than all of the multiple bits. Thus, remaining bits from the provider key are not sent to the identity asset consumer device. In this embodiment, in which the encrypted version of the identity asset is stored in a transaction in the blockchain, the processor-implemented method further includes: calculating, by the identity asset consumer device, the remaining bits from the provider key; determining, by the identity asset consumer device, the provider key based on calculated remaining bits and the received first bit and the received subsequent bits; retrieving, by the identity asset consumer device, the encrypted version of the identity asset on the blockchain; and decrypting, by the identity asset consumer device, the encrypted version of the identity asset by using all of the multiple bits in the provider key. That is, the identity asset consumer device completes the provider key by using brute computational power to determine what the remaining bits (that were not sent from the identity asset provider device to the identity asset consumer device) are. This allows the identity asset consumer device to complete the provider key, in order to retrieve and decrypt the encrypted identity asset.

In an embodiment of the present invention, the payment for the provider key is zero if the subsequent bits do not exceed the predetermined quantity of bits.

In an embodiment of the present invention, the processor-implemented method further includes registering, by the identity asset provider device, details of the creation of the identity asset with a trusted registrar service. The identity asset provider device then posts a declaration of anonymous ownership of the identity asset to the trusted registrar service.

In an embodiment of the present invention, the processor-implemented method further includes: registering, by the identity asset provider device, details of a creation of the identity asset with a trusted registrar service; posting, by the identity asset provider device, a signed declaration of anonymous ownership of the identity asset along with a unique hash value of the identity asset to the trusted registrar service; verifying, by the trusted registrar service, whether a posted hash value of the identity asset is a duplicate of one of previously posted unique hash values of identity assets related to previously posted declarations of anonymous ownership of identity assets; and rejecting, by the trusted registrar service, a declaration of anonymous ownership of the identity asset in response to the hash value of the identity asset being found to be a duplicate.

In an embodiment of the present invention, the processor-implemented method further includes: registering, by the identity asset provider device, details of a creation of the identity asset with a trusted registrar service; posting, by the identity asset provider device, a signed declaration of anonymous ownership of the identity asset along with a unique hash value of the identity asset to the trusted registrar service; verifying, by the trusted registrar service, whether a posted hash value of the identity asset is a duplicate of one of previously posted unique hash values of identity assets related to previously posted declarations of anonymous ownership of identity assets; and posting, by the trusted registrar service, the declaration of anonymous ownership of the identity asset to the blockchain network of devices in response to the hash value of the identity asset not being found to be a duplicate.

In one or more embodiments of the present invention, a processor-implemented method improves security in a blockchain network of devices, which supports a blockchain, by protecting security, privacy, financial fairness and secure transfer of identity assets. An identity asset provider device creates an identity asset related to an entity, where the identity asset provider device is utilized by an identity asset provider of the identity asset. The identity asset provider device creates a provider key, which is composed of multiple bits. The identity asset provider device sets a full price for the provider key. The full price is for all of the multiple bits that make up the provider key. The identity asset provider device encrypts the identity asset with the provider key in order to generate an encrypted version of the identity asset. The identity asset provider device transmits, to an identity asset consumer device, a first bit of the provider key, encrypted with a key agreed with the identity asset consumer device, and a proof of correctness for the first bit of the provider key. The identity asset provider device receives a blockchain key from the blockchain network of devices, and double encrypts the last bit, first with the key agreed with the identity consumer device, and then with the blockchain key in order to create a last encrypted bit. The identity asset provider device transmits, to the blockchain network of devices, the last encrypted bit and the proof of correctness for the last bit of the provider key. The identity asset provider device then transfers, to the identity asset consumer device, subsequent bits from the provider key, encrypted with the key agreed with the identity consumer device along with proofs of correctness for the subsequent bits. until n/2 number of subsequent bits are transferred (where n is the total number of bits in the provider key), double encrypts the corresponding reverse order bits (i.e., if the position of the bit in the provider key that is being transferred to the identity consumer device in the current round is: i, the reverse order bit is: n−i) from the provider key, first with the key agreed with the identity consumer device and then with the blockchain key to create encrypted subsequent bits from the provider key. The identity asset provider device transmits, to the blockchain network of devices, the encrypted reverse order subsequent bits and proofs of correctness for the encrypted reverse order subsequent bits. If one of the parties aborts the protocol before the protocol completes, one or more processors in the blockchain network of devices then determine how to ensure financial fairness to both parties based on set of pre-defined rules.

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 14, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 14 are intended to be illustrative only and that computing nodes 10 and cloud computing environment 50 can communicate with any type of computerized device over any type of network and/or network addressable connection (e.g., using a web browser).

Figure 15:
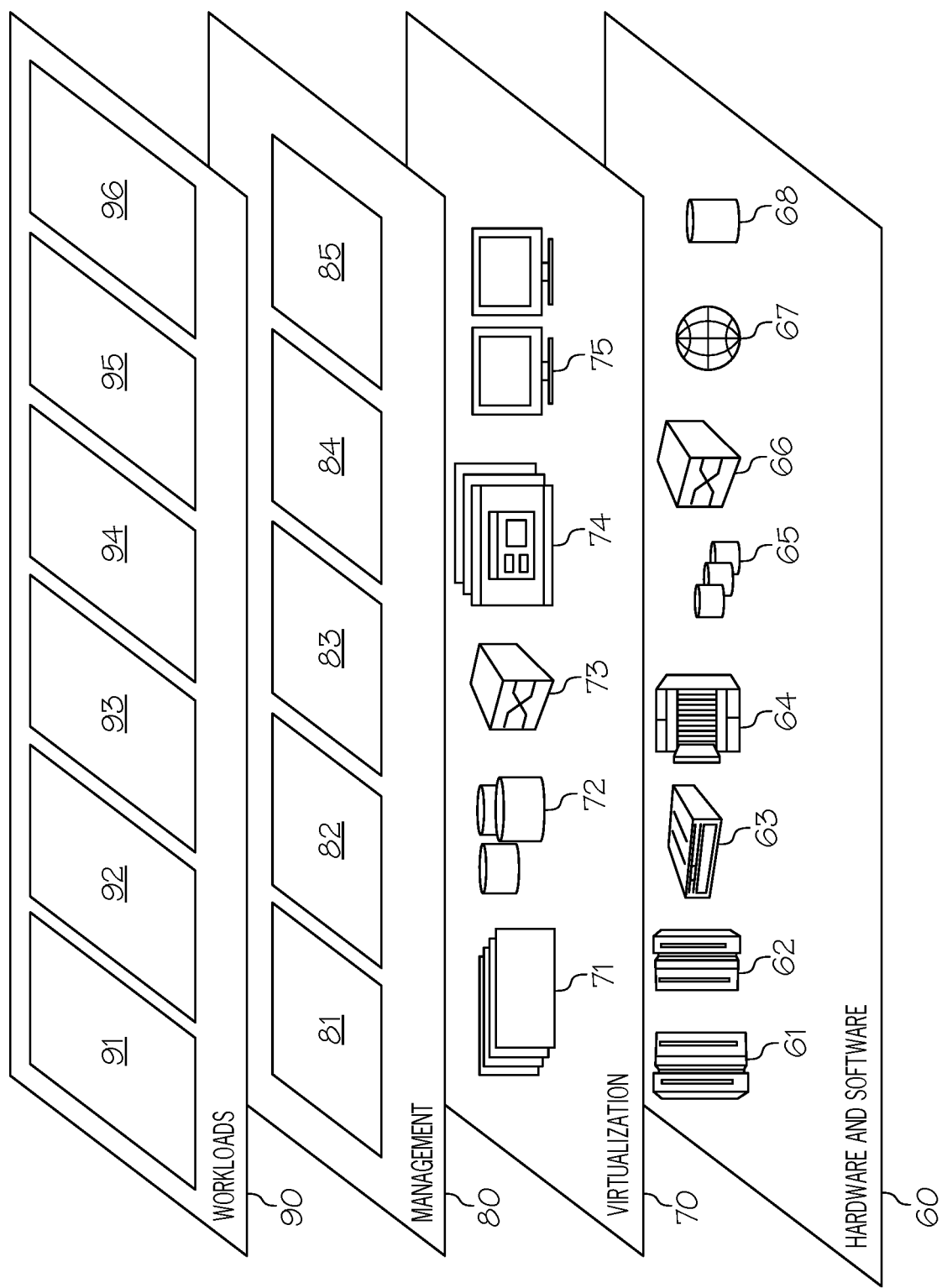
FIG. 15 depicts abstraction model layers of a cloud computer environment according to an embodiment of the present invention.

Referring now to FIG. 15, a set of functional abstraction layers provided by cloud computing environment 50 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and blockchain identity asset processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A processor-implemented method of improving security in a blockchain network of devices by protecting security, privacy, and secure transfer of identity assets, wherein the blockchain network of devices supports a blockchain, and wherein the processor-implemented method comprises:
   creating, by an identity asset provider device, an identity asset related to an entity, wherein the identity asset provider device is utilized by an identity asset provider of the identity asset;
   creating, by the identity asset provider device, a provider key, wherein the provider key is composed of multiple bits;
   setting, by the identity asset provider device, a full price for the provider key, wherein the full price is for all of the multiple bits that make up the provider key;
   encrypting, by the identity asset provider device, the identity asset with the provider key in order to generate an encrypted version of the identity asset;
   transmitting, from the identity asset provider device to an identity asset consumer device, a first bit of the provider key and a first proof of correctness for the first bit of the provider key;
   double encrypting, by the identity asset provider device a last bit of the provider key to create a last encrypted bit;

transmitting from the identity asset provider device to the blockchain network of devices, the last double encrypted bit and a second proof of correctness for the last bit of the provider key; and transferring, from the identity asset provider device to the identity asset consumer device, subsequent bits from the provider key, wherein the subsequent bits are bits that are after the first bit of the provider key and before the last bit of the provider key.

2. The processor-implemented method of claim 1, further comprising:

receiving, by the identity asset provider device, a blockchain key from the blockchain network of devices;

encrypting, by the identity asset provider device, the subsequent bits until n/2 number of subsequent bits in the provider key are transferred from the identity asset provider device to the identity asset consumer device, wherein n is a total number of bits in the provider key; and double encrypting, by the identity asset provider device, corresponding reverse order subsequent bits from the provider key to create encrypted reverse order subsequent bits.

3. The processor-implemented method of claim 1, further comprising:

posting, by the identity asset provider device, the encrypted version of the identity asset on the blockchain.

4. The processor-implemented method of claim 1, wherein the identity asset consumer device deposits a payment for each delivered bit of the provider key to an escrow account managed by the blockchain network of devices.

5. The processor-implemented method of claim 1, wherein the payment for the provider key is the full price if all of the multiple bits in the provider key are delivered to the identity asset consumer device, and wherein the processor-implemented method further comprises:

retrieving, by the identity asset consumer device, the encrypted version of the identity asset on the blockchain; and decrypting, by the identity asset consumer device, the encrypted version of the identity asset by using all of the multiple bits in the provider key.

6. The processor-implemented method of claim 1, wherein the payment for the provider key is a portion of the full price if the subsequent bits that are delivered to the identity asset consumer device exceed a predetermined quantity of bits but are less than all of the multiple bits, wherein remaining bits from the provider key are not sent to the identity asset consumer device, wherein the encrypted version of the identity asset is stored in a transaction in the blockchain, and wherein the processor-implemented method further comprises:

calculating, by the identity asset consumer device, the remaining bits from the provider key;

determining, by the identity asset consumer device, the provider key based on calculated remaining bits and the received first bit and the received subsequent bits;

retrieving, by the identity asset consumer device, the encrypted version of the identity asset on the blockchain; and decrypting, by the identity asset consumer device, the encrypted version of the identity asset by using all of the multiple bits in the provider key.

7. The processor-implemented method of claim 1, wherein the payment for the provider key is zero if the subsequent bits do not exceed a predetermined quantity of bits.

8. A computer program product for improving security in a blockchain network of devices by protecting security, privacy, and secure transfer of identity assets, wherein the blockchain network of devices supports a blockchain, wherein the computer program product comprises a non-transitory computer readable storage device having program instructions embodied therewith, the program instructions readable and executable by a computer to perform a method comprising:

creating, by an identity asset provider device, an identity asset related to an entity, wherein the identity asset provider device is utilized by an identity asset provider of the identity asset;

creating, by the identity asset provider device, a provider key, wherein the provider key is composed of multiple bits;

setting, by the identity asset provider device, a full price for the provider key, wherein the full price is for all of the multiple bits that make up the provider key;

encrypting, by the identity asset provider device, the identity asset with the provider key in order to generate an encrypted version of the identity asset;

transmitting, from the identity asset provider device to an identity asset consumer device, a first bit of the provider key and a first proof of correctness for the first bit of the provider key;

receiving, by the identity asset provider device, a blockchain key from the blockchain network of devices;

encrypting, by the identity asset provider device, the first bit with the blockchain key in order to create a first encrypted bit;

transmitting, from the identity asset provider device to the blockchain network of devices, the first encrypted bit and the first proof of correctness for the first bit of the provider key;

transferring, from the identity asset provider device to the identity asset consumer device, subsequent bits from the provider key along with second proofs of correctness for the subsequent bits, wherein the subsequent bits are bits that are after the first bit of the provider key and before the last bit of the provider key;

encrypting, by the identity asset provider device, the subsequent bits from the provider key with the blockchain key to create encrypted subsequent bits from the provider key;

transmitting, from the identity asset provider device to the blockchain network of devices, the encrypted subsequent bits and second proofs of correctness for the encrypted subsequent bits;

determining whether the subsequent bits exceed a predetermined quantity of bits; and adjusting a payment for the provider key based on whether the subsequent bits exceed the predetermined quantity of bits.

9. The computer program product of claim 8, wherein the method further comprises: posting, by the identity asset provider device, the encrypted version of the identity asset on the blockchain.

10. The computer program product of claim 8, wherein the identity asset consumer device deposits a payment for each delivered bit of the provider key to an escrow account managed by the blockchain network of devices.

11. The computer program product of claim 8, wherein the payment for the provider key is the full price if all of the multiple bits in the provider key are delivered to the identity asset consumer device, and wherein the method further comprises:
- retrieving, by the identity asset consumer device, the encrypted version of the identity asset on the blockchain; and
- decrypting, by the identity asset consumer device, the encrypted version of the identity asset by using all of the multiple bits in the provider key.

12. The computer program product of claim 8, wherein the payment for the provider key is a portion of the full price if the subsequent bits that are delivered to the identity asset consumer device exceed the predetermined quantity of bits but are less than all of the multiple bits, wherein remaining bits from the provider key are not sent to the identity asset consumer device, wherein the encrypted version of the identity asset is stored in a transaction in the blockchain, and wherein the method further comprises:
- calculating, by the identity asset consumer device, the remaining bits from the provider key;
- determining, by the identity asset consumer device, the provider key based on calculated remaining bits and the received first bit and the received subsequent bits;
- retrieving, by the identity asset consumer device, the encrypted version of the identity asset on the blockchain; and
- decrypting, by the identity asset consumer device, the encrypted version of the identity asset by using all of the multiple bits in the provider key.

13. The computer program product of claim 8, wherein the program instructions are provided as a service in a cloud environment.

14. A computer system comprising one or more processors, one or more computer readable memories, and one or more computer readable non-transitory storage mediums, and program instructions stored on at least one of the one or more storage mediums for execution by at least one of the one or more processors via at least one of the one or more memories, the stored program instructions comprising:
- program instructions to create an identity asset related to an entity, wherein the identity asset provider device is utilized by an identity asset provider of the identity asset;
- program instructions to create a provider key, wherein the provider key is composed of multiple bits;
- program instructions to set a full price for the provider key, wherein the full price is for all of the multiple bits that make up the provider key;
- program instructions to encrypt the identity asset with the provider key in order to generate an encrypted version of the identity asset;
- program instructions to transmit, to an identity asset consumer device, a first bit of the provider key and a first proof of correctness for the first bit of the provider key;
- program instructions to receive a blockchain key from the blockchain network of devices;
- program instructions to encrypt the first bit with the blockchain key in order to create a first encrypted bit;
- program instructions to transmit, to the blockchain network of devices, the first encrypted bit and the first proof of correctness for the first bit of the provider key;
- program instructions to transfer, to the identity asset consumer device, subsequent bits from the provider key along with second proofs of correctness for the subsequent bits, wherein the subsequent bits are bits that are after the first bit of the provider key and before the last bit of the provider key;
- program instructions to encrypt the subsequent bits from the provider key with the blockchain key to create encrypted subsequent bits from the provider key;
- program instructions to transmit, to the blockchain network of devices, the encrypted subsequent bits and second proofs of correctness for the encrypted subsequent bits;
- program instructions to determine whether the subsequent bits exceed a predetermined quantity of bits; and
- program instructions to adjust a payment for the provider key based on whether the subsequent bits exceed the predetermined quantity of bits.

15. The computer system of claim 14, further comprising:
- program instructions to post the encrypted version of the identity asset on the blockchain.

16. The processor-implemented method of claim 1, further comprising:
- double encrypting, by the identity asset provider, a reverse order of bits that are previous to the last bit of the provider key; and
- transmitting, from the identity asset provider device to the blockchain network of devices, the double encrypted reverse order of bits and third proofs of correctness for the double encrypted reverse order of bits.

17. The computer system of claim 14, wherein the payment for the provider key is the full price if all of the multiple bits in the provider key are delivered to the identity asset consumer device, and wherein the computer system further comprises:
- program instructions to retrieve the encrypted version of the identity asset on the blockchain; and
- program instructions to decrypt the encrypted version of the identity asset by using all of the multiple bits in the provider key.

18. The computer system of claim 14, wherein the payment for the provider key is a portion of the full price if the subsequent bits that are delivered to the identity asset consumer device exceed the predetermined quantity of bits but are less than all of the multiple bits, wherein remaining bits from the provider key are not sent to the identity asset consumer device, wherein the encrypted version of the identity asset is stored in a transaction in the blockchain, and wherein the computer system further comprises:
- program instructions to calculate the remaining bits from the provider key;
- program instructions to determine the provider key based on calculated remaining bits and the transmitted first bit and the transferred subsequent bits;
- program instructions to retrieve the encrypted version of the identity asset on the blockchain; and
- program instructions to decrypt the encrypted version of the identity asset by using all of the multiple bits in the provider key.

19. The computer system of claim 14, wherein the payment for the provider key is zero if the subsequent bits do not exceed the predetermined quantity of bits.

20. The computer system of claim 14, wherein the program instructions are provided as a service in a cloud environment.

* * * * *